Jan. 16, 1962    J. T. REDFERN ET AL    3,017,574
ELECTRICAL PHASE SHIFTER
Filed March 24, 1959
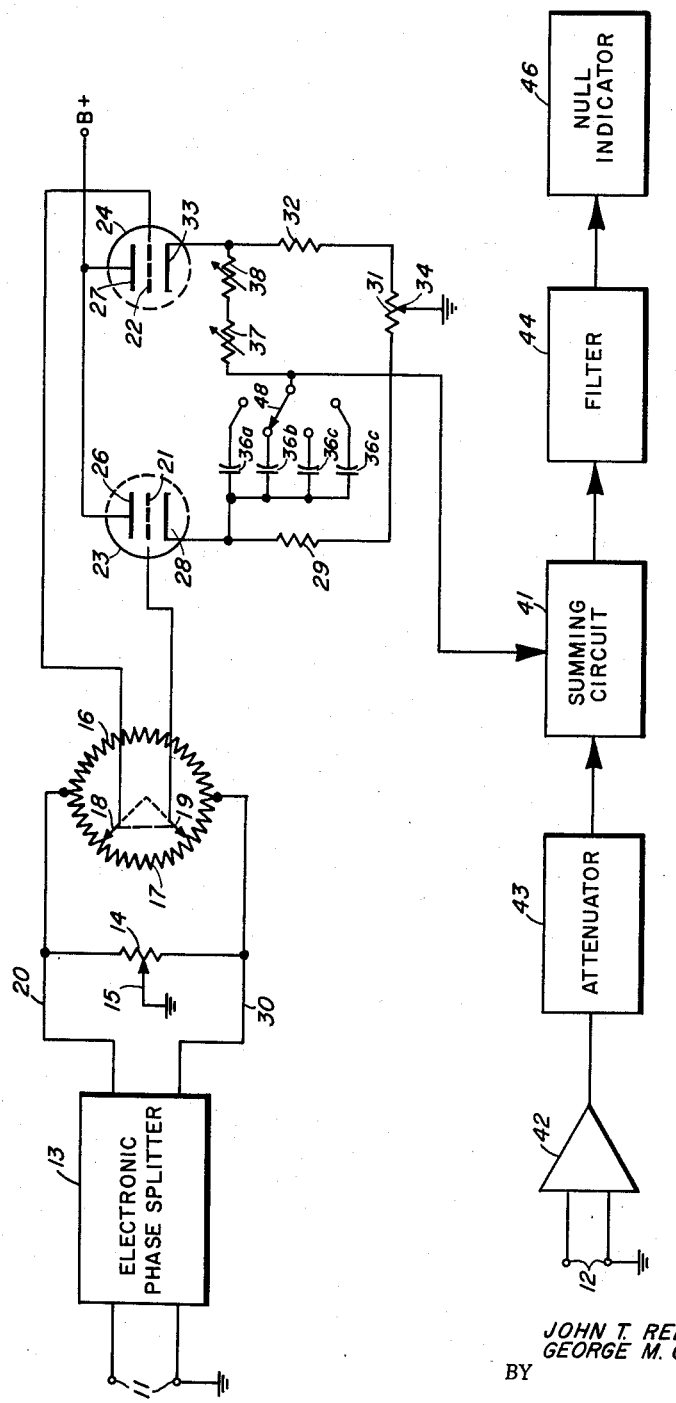
INVENTORS
JOHN T. REDFERN
GEORGE M. COLEMAN
BY
*Paul A. Crutcher*
ATTORNEYS United States Patent Office 3,017,574
Patented Jan. 16, 1962

3,017,574
ELECTRICAL PHASE SHIFTER
John T. Redfern, and George M. Coleman, San Diego, Calif., assignors to the United States of America as represented by the Secretary of the Navy
Filed Mar. 24, 1959, Ser. No. 801,677
(Granted under Title 35, U.S. Code (1952), sec. 266)
5 Claims. (Cl. 324—89)

The invention described herein may be manufactured and used by or for the Government of the United States of America for governmental purposes without the payment of any royalties thereon or therefor.

The present invention relates to an electronic phase comparitor and more particularly to an electronic phase comparitor capable of comparing signals of a wide frequency range with a high degree of background noise.

In the prior art the phase difference between two signals was measured by shifting the phase of one relative to the other with resolvers or resistive capacitive networks. The signals were then added together for a minimum value of their vector sum, indicating that the shifted signal was now 180 degrees out of phase with the reference signal. The amount of phase shift introduced was a measure of the original phase difference between the two signals. Other devices measure the time differential between the zero axis crossing of the two signals. The main disadvantage of these methods lay in the use of iron core elements which would not work at the lower frequencies needed. Resistance capacitance network of course operate only within a 180 degree range continuously, and zero axis crossing methods are not valid with complex waves. Furthermore, many of these systems utilized transformer or inductive coupling elements which in themselves have an inherent phase shift which limit the accuracy in calibration of the equipment. Another serious limitation of the prior art phase comparitors was the inability to filter the signals of interest from background noise without introducing objectionable phase shift inherent in the filtering process.

It is thus an object of the present invention to provide an accurate wide range phase comparitor.

Another object is the provision of a phase comparitor utilizing non-inductive coupling of the signal channels.

A further object of the invention is to provide a phase comparitor capable of comparing signals in a relatively high noise background.

According to the invention one of the signals to be compared is passed through an electronic phase splitter, the output of which is two signals, one in phase and the other 180 degrees out of phase with the input signal. These resultant signals are then coupled across two potentiometers in parallel, which form a geometric circle. These potentiometers have two wipers, mechanically linked 90 degrees apart, which are capable of complete 360 degree rotation. The signals picked off by the wipers are then coupled to a push-pull cathode follower stage. Across the output cathodes of the cathode followers are placed a resistor and capacitor in series, the impedances of which are equal at the signal frequency. At the junction of the resistor and capacitor is taken an output to an electronic summing circuit. The second signal to be compared is amplified, passed through a variable attenuator, and also coupled to an input of the summing circuit. The output of the summing circuit is then passed through a narrow band-pass filter tuned to the frequency of the two signals and then to an A.C. amplitude responsive means. Hence the first signal is shifted in phase by an amount determined by the angle of rotation of the circular potentiometer, resolved, and compared with the second channel, without the necessity of iron core or inductive coupling elements. The frequency of the signals is compensated for by merely changing the resistance-capacitance ratio in the output of the push-pull cathode follower stage. The system is thus tunable over a wide range. Another disadvantage of the prior art is overcome by the filtering of the two channels after they have been compared, which does not result in any undesirable relative phase shift in the filtering process.

Other objects and many of the attendant advantages of this invention will be readily appreciated as the same becomes better understood by reference to the following detailed description when considered in connection with the accompanying drawing wherein the single figure shows a schematic diagram of the present invention partially in block form.

Referring now to the drawing there is shown two pairs of input terminals at 11 and 12, the input terminals 11 being coupled to electronic phase splitter 13. The output of electronic phase splitter 13 is coupled across potentiometer resistor 14, having sliding contact 15 connected to ground or any suitable reference point, and to two resistors in parallel 16, 17, forming a geometric circle. The circular resistance 16, 17 has slidable contacts 18 and 19 which are in turn connected to grids 21 and 22 of tubes 23 and 24 respectively. Anodes 26 and 27 are connected directly to B+. Cathode 28 is connected through resistor 29 to one end of resistor 31, the other end of which is connected through resistor 32 to cathode 33. Slidable contact 34 on resistor 31 is grounded. Also connected to cathode 28 are condensers 36a, 36b, 36c and 36d. The other side of capacitors 36 are each connected to a contact of switch 39. Wiper 40 of switch 39 is connected through variable resistances 37 and 38 to cathode 33. Wiper 40 is also connected to one input of summing network 41. Input terminals 12 are connected to the input of amplifier 42, the output of which is passed through variable attenuator 43 to a second input of summing network 41. The output of summing network 41 is passed through tuned filter 44 the output of which is indicated in null indicator 46.

Operation

The operation of this system is as follows: The two signals to be compared are coupled one each to input terminals 11 and 12. The signal at input terminal 11 is passed through electronic phase splitter 13, which can be any of the well known types operable to split an input wave form into two output signals of equal amplitudes and 180 degrees removed in phase. These two signals then appear on output lines 20 and 30 across which is placed resistor 14 with grounded contact 15. This resistor serves to reference the following grid circuit with respect to the cathodes and also serves to overcome any dynamic imbalance due to slight amplifier variances in the cathode follower stages, or variances in amplitude from the phase splitter 13. Also across output lines 20 and 30 are resistors 16 and 17 in parallel. These resistors can be of either carbon or wire-wound types and are designed to present resistance values between contacts 18 and 19 and ground which vary non-linearly as the sine function of the angle of rotation of contacts 18 and 19. It will be noticed at this point that the ground from resistor 15 is reflected to the corresponding midpoint on each of resistors 16 and 17. Thus, since the two contact arms 18 and 19 are angularly spaced by 90 degrees, when contact arm 18 is midpoint between lines 20 and 30 on resistor 16 there will be zero potential with respect to ground on contact 18. At that time contact 19 will be 90 degrees in a counterclockwise direction and picking up the full voltage available on line 20. Thus if this is selected to be the zero phase shift position contact 18 will correspond to the cosine of the angular rotation and contact 19 will correspond to the sine of the angular rotation. At 90 degrees of rotation the contact 18 will then be at a maximum from line 20 and contact 19 will be at a reflected ground potential. At 180 degrees contact 18 will again be at ground potential and contact 19 will see the full output on line 30. Since this output is of opposite phase to the output on line 20 this will be a negative maximum, which again corresponds to sine function in that quadrant. It can be seen then that the output at contacts 18 and 19 will correspond in amplitude and sign to the sine and cosine of the angle of rotation from the predetermined zero point i.e. where contact 18 is midway between lines 20 and 30 on resistor 16 and contact 19 is at a junction of resistors 16 and 17 at line 20. Thus, what appears at the output of cathode followers 23 and 24 is a voltage corresponding in phase and amplitude to the sine of the angle of rotation on cathode 28 and a voltage corresponding in phase and amplitude to the cosine of the angle of rotation at cathode 23.

Capacitors 36a, b, c, and d represent frequency ranges of the equipment. As mentioned before, at the frequency of operation in order to maintain the output amplitude constant the capacitive reactance and resistance represented by capacitance 36 and resistors 37 and 38 must be of equal amplitudes. Thus the particular capacitor 36 selected by switch 39 corresponds to a particular range of frequencies and the resistors 37 and 38 are variable to provide adjustments within each range. The output of the junction of capacitor 36 and resistor 37 taken at wiper 40 of switch 39 is then coupled to one input of summing network 41. It might be mentioned at this point that although cathode resistors 29 and 32 are made equal in resistance, to maintain static balance variable resistor 31 is provided with slidable contact 34 to overcome any imbalance caused by a variation in emission or amplifier characteristics between the two tubes.

The other frequency signal to be compared is taken at terminals 12 to amplifier 42 which can be any conventional amplifier and passed through variable attenuator 43. Attenuator 43 is adjusted to bring this signal within the amplitude range of the other signal to be compared. This attenuated signal is then coupled to the other input of summing network 41 the output of which is the vector sum of the two signals. This output is then filtered in a very narrow band-pass filter 44 which is tunable over the entire range of the equipment, as determined by the resistors 37 and 38 and capacitor bank 36. Filter 44 is interposed at this point in order that the two signals be presented with the identical phase shift which is inherent in all filtering i.e. this overcomes the necessity for expensive exactly-matched filters placed in each channel, which has been utilized in the prior art in order to compare signals in a noisy environment. The output of filter 44 is then indicated in null indicator 46, which is any AC amplitude responsive device.

The mathematical analysis is as follows: The grids 21 and 22 of cathode followers 23 and 24 are driven with voltages having amplitudes given by $E \cos \theta$ and $E \sin \theta$ where $\theta$ is a mechanical angle of rotation of wipers 18 and 19. The complete expressions for the voltages applied to grids 21 and 22 are then:

$$E_{21} = (E \cos \theta) e^{j(wt+\phi)} \quad (1)$$
$$E_{22} = (E \sin \theta) e^{j(wt+\phi)} \quad (2)$$

where $w$ is the angular frequency of interest, $\phi$ is some fixed initial reference phase angle, and $E$ is the amplitude of the outputs from electronic phase splitter 13. Assuming the cathodes 23 and 28 to have the same potential as grids 21 and 22, respectively, the current $i$ through capacitor 36 and resistors 37 and 38 will be:

$$i = \frac{E_{21} - E_{22}}{R - jX_c} \quad (3)$$

Since
$$R = X_c \quad (4)$$
then
$$i = \frac{E_{21} - E_{22}}{R(1-j)} \quad (5)$$

Since the output voltage
$$V = E_{22} - (-iR) \quad (6)$$

then substituting Equation 5 into 6:
$$V = E_{22} + \frac{E_{21} - E_{22}}{R(1-j)} R \quad (7)$$

or
$$V = \frac{E_{21} - jE_{22}}{1-j} \quad (8)$$

Substituting
$$1 - j = \sqrt{2} e^{-j\pi/4}$$

and Equations 1 and 2 into Equation 8
$$V = (E/\sqrt{2}) e^{j(wt+\phi+(\pi/4)-\theta)} \quad (9)$$

Therefore at the frequency for which
$$R = 1/2\pi f c \quad (10)$$

the mechanical rotation $\theta$ appears as an electrical phase angle in the output voltage $V$. The angle $\theta$ can be read from a mechanical dial (not illustrated) on the circular resistors 16 and 17.

Thus an electronic phase comparitor has been disclosed which is not limited to a narrow frequency band due to transformer or inductive coupling and does not have the disadvantages inherent in the prior art limiting the amount of permissible background noise. It is also emphasized that the vacuum tube resolver has been made practical through the employment of both static and dynamic controls which again are conspicuously missing in the prior art comparators utilizing vacuum tube resolver.

Obviously many modifications and variations of the present invention are possible in the light of the above teachings. It is therefore to be understood that within the scope of the appended claims the invention may be practiced otherwise than as specifically described.

What is claimed is:

1. An electronic phase comparator comprising, electronic phase splitting means having input terminals and output terminals said input terminals connected to a first signal to be compared and a reference point, said phase splitting means operable to deliver to said output terminals a first output signal of the same phase as said first signal to be compared, and a second output signal 180° removed in phase from said first signal to be compared and equal in amplitude to said first signal, a resistance loop comprising two equal resistors each connected in parallel across said phase splitter output terminals forming a geometric circle, first and second contact wipers in electrical contact with said resistance loop angularly displaced by 90° and rotatable around said resistance loop, said resistors designed to vary in resistance progressively from points electrically equidistant from said phase splitter output terminals with the sine of the angle of rotation of said first and second wipers from said points, a third resistor connected across said phase splitting means output terminals, a third movable wiper contact on said third resistor connected to said reference point, first and second vacuum tubes each having a cathode, control grid and anode, said first and second wipers connected to the first and second vacuum tube grids respectively, said first and second vacuum tube anodes connected to a positive voltage source, said first vacuum tube cathode connected through a fourth resistor to one end of a fifth resistor, said second vacuum tube cathode connected through a sixth resistor to the other end of said fifth resistor, said fifth resistor having a slidable contact connected to said reference point, a seventh resistor and a capacitor connected in series between said first and second vacuum tube cathodes, said seventh resistor and said capacitor having equal impedances at the frequency of said signals, an amplifier having an input and an output, said amplifier input connected to a second signal to be compared, said amplifier output connected through a variable attenuator to one input of a summing means, a second input of said summing means connected to the junction of said seventh resistor and capacitor, a narrow passband filter connected to the output of said summing means, said filter tunable to the frequency of said signals, and amplitude responsive means connected to the output of said filter.

2. The electronic phase comparator of claim 1 wherein said seventh resistor and said capacitor comprise a plurality of different capacitors each having a pre-selected capacity connected to said first cathode, a variable resistance connected to said second cathode and a switch operable to connect said variable resistance to any one of said capacitors.

3. An electronic phase comparator comprising, electronic phase splitting means having input terminals and output terminals said input terminals connected to a first signal to be compared and a reference point, said phase splitting means operable to deliver to said output terminals a first output signal of the same phase as said first signal to be compared, and a second output signal 180° removed in phase from said first signal to be compared and equal in amplitude to said first signal, a resistance loop comprising two equal resistors each connected in parallel across said phase splitter output terminals forming a geometric circle, first and second contact wipers in electrical contact with said resistance loop angularly displaced by 90° and rotatable around said resistance loop, said resistors designed to vary in resistance progressively from points electrically equidistant from said phase splitter output terminals with the sine of the angle of rotation of said first and second wipers from said points, a third resistor connected across said phase splitting means output terminals, a third movable wiper contact on said third resistor connected to said reference point, electronic resolving means, said first and second wiper contacts connected to the input of said resolving means, tuning means operable to tune said resolving means through a predetermined band of frequencies, an amplifier having an input and an output, said amplifier input connected to a second signal to be compared, said amplifier output connected to one input of a summing means, a second input of said summing means connected to the output of said electronic resolver, a narrow passband filter connected to the output of said summing means, said filter tunable to the frequency of said signals, and amplitude responsive means connected to the output of said filter.

4. In an electronic phase comparator of the type utilizing phase splitting means having input terminals and output terminals said input terminals connected to a first signal to be compared and a reference point, said phase splitting means operable to deliver to said output terminals a first output signal of the same phase as said first signal to be compared, and a second output signal 180° removed in phase from said first signal to be compared and equal in amplitude to said first signal, a resistance loop comprising two equal resistors each connected in parallel across said phase splitter output terminals forming a geometric circle, first and second contact wipers in electrical contact with said resistance loop angularly displaced by 90° and rotatable around said resistance loop, said resistors designed to vary in resistance progressively from points electrically equidistant from said phase splitter output terminals with the sine of the angle of rotation of said first and second wipers from said points, a third resistor connected across said phase splitting means output terminals, and a third movable wiper contact on said third resistor connected to said reference point, the improvement comprising a wide range resolver consisting of first and second amplifying means each having at least an anode, cathode and control element, said first and second wipers connected to said control elements respectively, one of said cathodes connected through resistance means and reactive means in serial relationship to the other of said cathodes, said resistive and reactive means having equal impedances at the frequency of said signals and an output taken at the junction of said resistive and reactive means.

5. In an electrical phase comparator for comparing a first signal with a second signal, an electronic phase splitter having input terminals and output terminals, said input terminals being used for application of said first signal, said electronic phase splitter being adapted to produce a third signal and a fourth signal, said third signal being in phase with said first signal and said fourth signal being phase shifted 180 degrees with respect to said first signal, a potentiometer having first and second rotatable wiper contacts, said wipers being adapted to rotate 360 degrees, the angle assumed by said wipers being designated $\theta$, means for connecting said potentiometer to said third and fourth signals, said potentiometer adapted to amplitude modulate said third signal by the cosine of $\theta$, said potentiometer adapted to amplitude modulate said fourth signal by the sine of $\theta$, said amplitude modulated signals being produced at said wiper contacts, respectively, two cathode follower circuits each having an input and an output, means for coupling said modulated signals to said inputs, respectively, a capacitor and a resistor connected in series between said cathode follower outputs, means for adjusting the amplitude of said first signal to coincide with the amplitude of said second signal, a summing circuit having two inputs and an output, means for coupling said amplitude adjusting means to one of said inputs, means for coupling the junction of said capacitor and said resistor to said other input, a band-pass filter having an input and an output, said filter being tuned to the frequency of said first and second signals, means for coupling the output of said summing circuit to the input of said filter, a null indicator, and means for coupling said indicator to the output of said filter.

References Cited in the file of this patent

UNITED STATES PATENTS

| | | |
|---|---|---|
| 1,495,466 | Wente | May 27, 1924 |
| 2,241,615 | Plebanski | May 13, 1941 |
| 2,394,892 | Brown | Feb. 12, 1946 |
| 2,429,636 | McCoy | Oct. 28, 1947 |
| 2,432,778 | Luck | Dec. 16, 1947 |
| 2,471,105 | Gustafson et al. | May 24, 1949 |
| 2,517,805 | Spindler | Aug. 8, 1950 |
| 2,711,508 | Stirrat | June 21, 1955 |
| 2,762,012 | Kaltenbacher | Sept. 4, 1956 |
| 2,902,650 | Kaiser | Sept. 1, 1959 |

FOREIGN PATENTS

| | | |
|---|---|---|
| 451,786 | Great Britain | Aug. 12, 1936 |

OTHER REFERENCES

"Measuring Phase Angles in Communication Circuits," article in Tele-Tech, December 1949, pages 26-37.